May 1, 1934. E. B. SYMONS Re. 19,154

PROCESS OF CRUSHING HARD MATERIALS

Original Filed May 15, 1924 2 Sheets-Sheet 1

Inventor.
Edgar B. Symons
by Parker & Carter
Attorneys.

May 1, 1934. E. B. SYMONS Re. 19,154
PROCESS OF CRUSHING HARD MATERIALS
Original Filed May 15, 1924 2 Sheets-Sheet 2
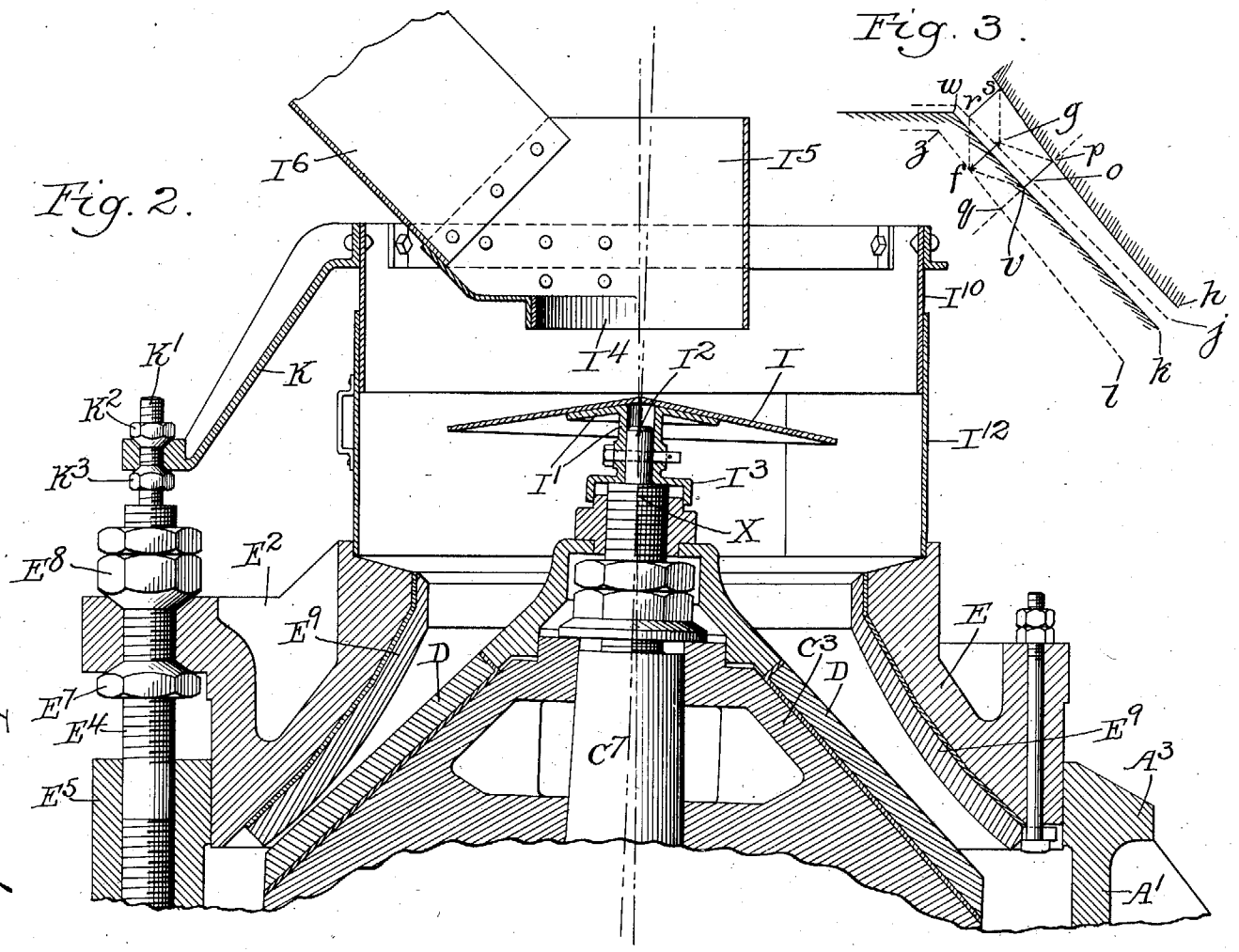
Inventor.
Edgar B. Symons
by Parker & Carter
Attorneys.

Reissued May 1, 1934 Re. 19,154

UNITED STATES PATENT OFFICE 19,154

PROCESS OF CRUSHING HARD MATERIALS

Edgar B. Symons, Hollywood, Calif., assignor, by mesne assignments, to Nordberg Manufacturing Company, Milwaukee, Wis., a corporation of Wisconsin Original No. 1,537,565, dated May 12, 1925, Serial No. 713,397, May 15, 1924. Application for reissue February 16, 1934, Serial No. 711,619

22 Claims. (Cl. 83—10)

My invention relates to a process of crushing hard materials and particularly to a process of crushing materials such as stone, wherein materials drop freely through the crushing zone, and freely pass therethrough by gravity, being periodically interrupted by a succession of crushing impacts. One object of my invention is the provision of a crushing process wherein the materials shall be crushed to a uniform grade, and wherein there shall be a minimum of degradation or production of fine or under-standard particles in ordinary crushing. Another object is the provision of a crushing process wherein the materials are relatively scattered or divided as they pass through the crushing zone, and wherein the crushing action of one particle upon another is reduced to a minimum. Another object is the provision of a method of crushing to any desired degree of fineness. Other objects will appear from time to time in the course of the specification and claims.

I illustrate my invention more or less diagrammatically in the accompanying drawings, wherein—

Figure 2 is a detail section showing a modified form of mechanism for carrying out my process; and Figure 3 is a diagrammatical illustration of the crushing process.

Like parts are illustrated by like characters throughout the specification and drawings.

Figure 1:
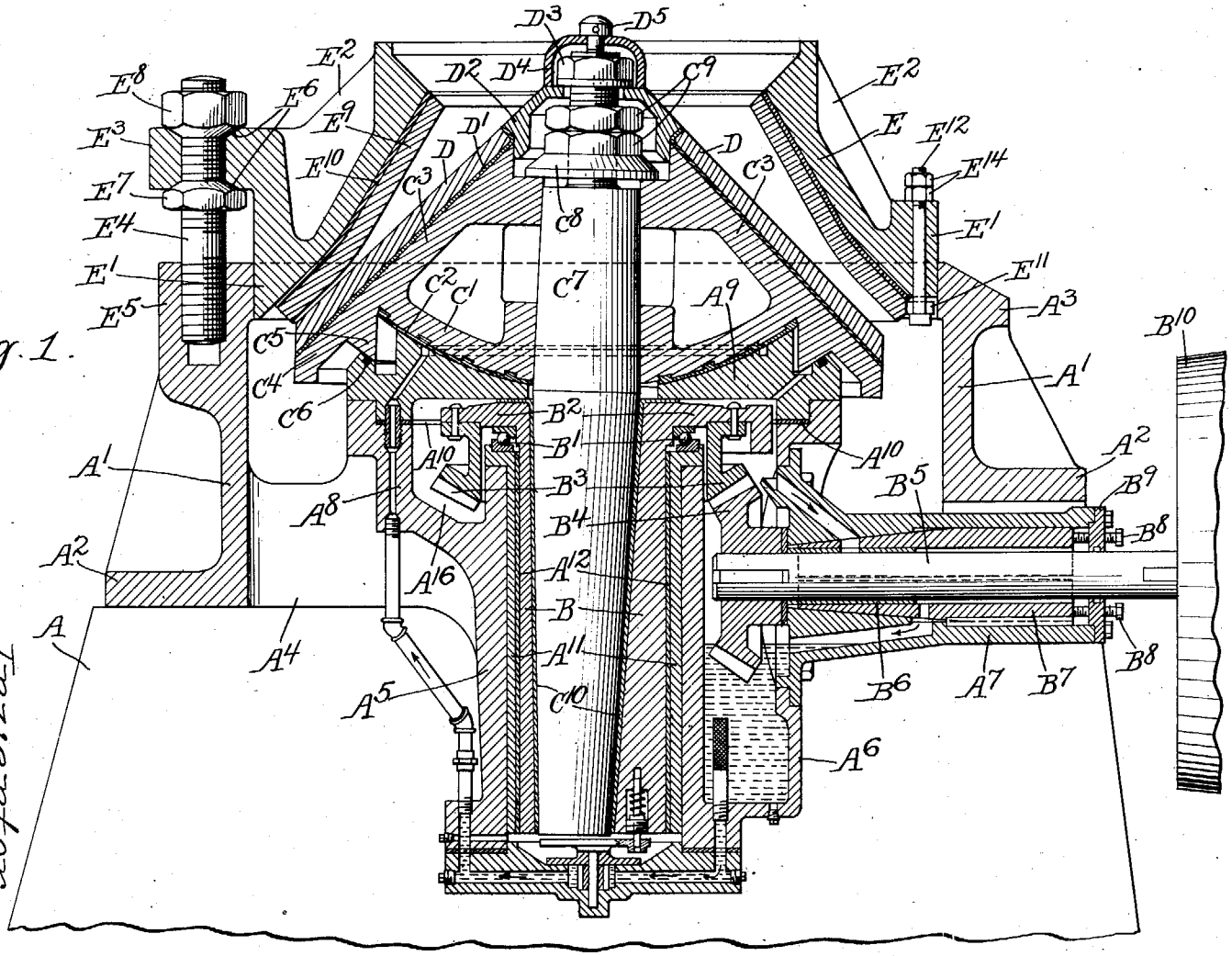
Figure 1 is a vertical section.

A is a bed which rests upon the frame $A^1$ outwardly flanged as at $A^2$ for stiffness, and provided at its top with a reinforcing flange $A^3$. $A^4$, $A^4$ are radial bearing arms extending inwardly from the frame $A^1$ to support a rigid bearing sleeve $A^5$. One side of this bearing sleeve carries a gear case $A^6$ from which projects laterally the horizontal sleeve $A^7$ projecting from the frame. The sleeve $A^5$ terminates in a gear $A^{16}$ which is formed by a flange $A^8$ projecting outwardly from the body of the sleeve $A^5$ inclosed by the bearing cap $A^9$, there being an oil tight packing $A^{10}$ between this cap and the top of sleeve $A^8$. The sleeve $A^5$ is provided with a tightly fitting lining $A^{11}$.

B is an eccentric sleeve mounted for rotation in the bearing and having an outer babbitted bearing $A^{12}$. It is flanged at $B^2$ and has an annular ball bearing $B^1$ resting on the flanged upper end of the lining $A^{11}$ to support the downward thrust caused by the weight of the eccentric and its associated parts. $B^3$ is a ring gear bolted or riveted to the underside of the flange $B^2$ surrounding the upper end of the bearing $A^5$ and located within the gear case $A^{16}$. $B^4$ is a bevel pinion in mesh with the gear $B^3$ mounted on the drive shaft $B^5$ which shaft rotates in a bearing $B^6$ carried by the two part split adjustable bearing support $B^7$, which support is outwardly tapered and feather in the sleeve $A^7$. The two parts of the bearing support are adapted to be forced inwardly to adjust the bearing by means of feed screws $B^8$ in the cap $B^9$ which cap is bolted in place to close the open end of the sleeve $A^7$. $B^{10}$ is a belt pulley, keyed to the shaft $B^5$.

The bearing cap $A^9$ has at its upper side a spherical bearing surface which supports a segmental ball member $C^1$ having a babbitt facing $C^2$ to engage the spherical bearing surface. $C^3$ is the crushing head or cone mounted on and integral with the segmental ball above referred to. It has a skirt $C^4$ extending downwardly below the ball bearing and is provided immediately below the bearing covered by the skirt with a flange $C^5$, having a spherical surface concentric with the ball bearing engaging an oil packing ring $C^6$ in a spherical surface on the cap $A^9$ which surface is also concentric with the ball bearing. $C^7$ is a shaft mounted in the cone, tapered and locked by the compression ring $C^8$ and the nuts $C^9$. This shaft extends down through the cap $A^9$ making a close fit with the babbitt surface $C^{10}$ on the inside of the eccentric sleeve B, so that when the sleeve is rotated the shaft will be gyrated and cause the cone to gyrate on its spherical bearing.

D is a conical mantle of manganese steel or other suitable material carried on the cone supported by packing $D^1$ of zinc or the like. $D^2$ is a conical plug adapted to engage the upper portion of the mantle D to hold it in place. This plug is held down by means of the nut $D^3$ which is covered by the cap $D^4$ held in place by the set screw $D^5$.

E is a conical spider having a cylindrical flange $E^1$ adapted to penetrate and be vertically adjustable in the frame $A^1$. It is provided with reinforcing ribs $E^2$ and three laterally extending lugs $E^3$. Adjusting bolts $E^4$ are screw threaded in bosses $E^5$ on the ring $A^1$, and pass through the lugs $E^3$. The lugs $E^3$ are countersunk at $E^6$ and supporting nuts $E^7$ and locking nuts $E^8$ have conical surfaces to engage these countersunks so that when the nuts $E^8$ have been slacked off the nuts $E^7$ may be rotated to raise or lower the spider and adjust it toward and from the crushing head or cone. $E^9$ is a concave mantle carried by the spider E provided with a zinc or other suitable packing $E^{10}$. Lugs $E^{11}$ projecting from the lower edge of the concave are engaged by holding bolts $E^{12}$ which pass upwardly through the flange $E^1$ and are held in place to support the mantle by the nuts $E^{14}$. The spider is outwardly flared above the cone to provide a funnel or hopper to guide the material to be crushed into the crushing area.

In order to regulate the feed to the crushing zone, I provide a feed plate I illustrated as slightly conical, though the character of its surface will depend largely on the material to be fed, the rate of gyration and the like, and under some circumstances it may be flat. This feed plate is mounted upon a supporting cap $I^1$ bolted to a lug $I^2$ projecting upwardly from the end of the crushing shaft $C^7$ and having an apron $I^3$ to protect and inclose the plates on the shaft. This feed plate is located above the center of gyration of the crusher and is in line with a feed spout $I^4$, which spout may be moved to and from the plate to adjust the space between the lower extremity of the spout, and the plate so as to control the flow of material through the spout around and off the periphery of the plate. The spout $I^4$ is contacted by an upper lateral extension $I^5$ adapted to communicate with a supply pipe or chute $I^6$ whereby material may be fed to the machine. Any suitable directing or deflecting means may be used to direct the material from the plate through the crushing zone, for example the telescoping cylindrical shell formed of the sections $I^{10}$, $I^{12}$ which may be supported in any suitable manner upon the spider, for example by the spider arms K adjustable upon the screw threaded studs K′ by means of the adjusting nuts $K^2$, $K^3$. X indicates the center of oscillation of the crusher head.

The operation of my invention is as follows:

The crushing process which I perform with the apparatus herein disclosed may be carried out with other apparatus, and I do not wish to be limited to the use of the apparatus shown. However, I have developed a mechanism which is well adapted for the carrying out of the process, and which works as follows:

When the machine is set up as shown in the drawings and the drive shaft is rotated, it rotates the eccentric sleeve and thereby causes the eccentric shaft to gyrate or wabble. The eccentric shaft in turn gyrates the conic crushing head which rocks or gyrates on its large spherical bearing. The head, in response to the movement of the eccentric sleeve and the eccentric shaft, gyrates about a point adjacent the apex of the cone, this central point being determined by the curvature of the spherical bearing. As the head gyrates, the point of closest-approach between head and concave travels about the concave.

The material to be crushed is fed in from above, falling freely under gravity into the crushing space between the concave and the cone. As the cone gyrates, material will be wedged or pinched between it and the concave, and each particle as soon as it has been crushed, will commence to fall freely away from the concave, the distance of its fall depending on the relation between the acceleration due to gravity, the rate and length of gyration of the cone, the angle of the cone, and the size of the particle.

Since the concave overhangs the cone, this dropping action of the material away from the surface of the concave is obtained, by withdrawing the cone with sufficient rapidity from the concave. After each crushing impact I move the head through an excursion of such length and gyrate it at such a rate that the cone recedes from the concave faster than the material can drop. Since the cone is withdrawn from beneath the material which has just been crushed, the particles will fall vertically downwardly from the concave until they again strike the cone, and they will then be deflected by the inclination of the cone and will slide downwardly and outwardly along the cone. Meanwhile, the cone returns again toward the concave, carrying with it toward the concave the particles which have dropped upon the cone and which are sliding down its surface. When the cone reaches a point at which the distance between its surface and the concave is equal to the diameter of the particles sliding down the cone, then the downward movement of the particles ceases and they are again crushed. This alternate lateral conveying, crushing, vertical drop and lateral conveying continues until the particles being crushed have escaped from the crushing zone and pass downwardly across the lower edge of the cone.

This action is diagrammatically shown in Figure 3, wherein *s—h* is the fixed surface of the concave. *r—j* indicates the line of closest approach of cone to concave and *z—l* the line of farthest recession of cone from concave. The line *r—s* represents the cross section of the material crushed at the first crushing impact, being the minimum distance between cone and concave at the point adjacent the top of the cone where the particle being crushed was caught between cone and concave and crushed. In other words, *r—s* is the first reduction, and represents the size to which the material is reduced by the first crushing impact. As the cone is withdrawn from *r—j* to *z—l* the material of the size *r—s* drops vertically away from the concave and is finally received by the cone, striking it, for example at the point *f* and extending outwardly from the face of the cone to the point *g*. The motion of the particle until it strikes the cone is simply a vertical drop. When it is again in contact with the cone its motion is a compound one, since it slides downwardly and outwardly along the inclined surface of the cone and is at the same time laterally conveyed by the cone towards the concave. It continues this motion until it is carried so far laterally by the cone as again to contact the concave. Its position at this point is indicated in Figure 3 by the line *v—p* which is equal to *r—s*, since the particle has not been reduced since its reduction at *r—s*. But since the distance between cone and concave at their nearest approach decreases from top to bottom of the cone, the distance *v—p* is greater than the minimum distance between cone and concave at that point, and the cone continues its lateral excursion, reducing the particle to the size *o—p*. It is again withdrawn and the particle, sized to *o—p*, drops vertically away from the concave, only to be caught again by the cone, slides therealong and is carried again laterally toward the concave for further reduction. The crushing sequence through which each particle passes is therefore as follows:

An initial drop under the influence of gravity into the space between cone and concave; contact with the cone; a sliding downwardly along the cone during the lateral movement of the cone; a crushing impact terminating this lateral and sliding movement upon the cone; a vertical drop directly downwardly from the concave at the termination of the crushing impact; a further slide along and lateral excursion with the cone; a further crushing impact terminating it, and so on until the reduction is completed.

In order to obtain a positive sizing for the particles so crushed, I provide a zone of parallelism about the bottom of the cone and concave, in which the opposed walls of the crushing elements are parallel. The length of the zone of parallelism is governed by two main factors; first, the speed imparted to the material by gravity, gravity being a constant force, and second, the interval of time between the crushing impacts, during which the material is permitted to drop as it is released by the increasing distance between the opposed cone and concave, and during which it slides along the cone prior to the crushing nip. The interval of time is governed by the speed of operation of the machine. The length of the zone of parallelism must be such that all the material passing therethrough will remain in the zone so long as to be caught at least once by the cone and the concave at the moment of their closest approach. The maximum distance between concave and cone is far greater than the ultimate size of the material crushed. This must be so, since in fine reduction crushing I may reduce material to one-quarter of an inch or less, while using a stroke of two and one-half inches or more when measured at the base of the cone. This last crushing impact reduces every particle to at least the same maximum size, the particles being sized positively by the minimum opening between cone and concave.

In any crushing process, a certain amount of degradation or fines will be produced. I reduce the fines to a minimum, however, since as the particles drop from the concave and are received upon the cone, they spread out upon the surface of the cone and slide or roll freely downwardly thereupon. Thus when the material is crushed the particles are not superposed upon each other or compacted, but are freely spread, and the larger particles project farther from the surface of the cone than the smaller and are crushed first. Particles which have, for any reason, been crushed at the preceding crushing impact to a size less than the minimum distance between cone and concave at the next impact, are not crushed at all thereby.

The total throw of the head is divided into a lateral conveying excursion and a crushing excursion. The actual crushing excursion is substantially smaller than the lateral conveying excursion. Furthermore, its length in relation to the conveying excursion decreases progressively from top to bottom of the cone, as the material is successively reduced, and, as in the form of crusher herein shown, the movement of the crushing surface increases. Thus in fine crushing, relatively large fragments of material are progressively reduced, and, as they pass downwardly between cone and concave, at each conveying excursion the point at which they come in contact with the concave is nearer and nearer the termination of the throw of the head. The throw of the head at the bottom of the cone may exceed two and one-half inches, whereas when the crusher is set to crush one-quarter of an inch or less, the actual final crushing excursion may itself be not over one-quarter of an inch in length. Consequently, the arc of simultaneous crushing opposition of the opposed crushing elements decreases progressively from top to bottom of the crushing zone. It is less than 180 degrees at the top of the crushing zone and may amount to but a few degrees at the bottom, in case of fine crushing. Since the head itself gyrates about a point adjacent the top of the cone, and since the cone gyrates upon a spherical bearing surface, the total throw of the head itself increases progressively from top to bottom of the cone.

In my crushing process it is necessary that the space between cone and concave be sparsely filled with material undergoing crushing, in order that there may be space for the material freely to drop, and in order that compacting of the material and filling of the crushing space may be avoided, I therefore find it advantageous to control and limit the feed of material to the crushing zone. As an example of means for controlling the feed for a crusher of the type I have herein illustrated, I have illustrated a feed spout and a feed plate, the feed plate being positioned above the cone and gyrating with it, the feed spout being centrally aligned with the plate and cone, and being vertically adjustable in relation thereto.

In operation the feed spout is constantly filled with material and delivers a column of material which rests upon the plate I. The progress of the column is arrested by the plate, which thus positively governs the feed to the crusher. The material will be drawn from the bottom of the column and fed through the space below the feed plate and into the crushing zone, at a rate depending upon the inclination of the surface of the fed plate, and the rate of gyration of the crushing head, both of which are normally fixed, and the distance between the feed plate and the spout or chute, which can be adjusted by the operator. The inclination of the plate is preferably but not necessarily such that the high side of the plate is level.

As the feed plate is gyrated and laterally displaced about its center, it will retain its general perpendicularity to the axis of the crushing shaft, and it therefore will be progressively tilted. This will result in feeding from about the periphery of the feeding plate a relatively thin stream of material, which will be fed or dropped down through the open space beneath the plate to the crushing zone. Since the gyration is at high speed, and the stream of material comparatively thin, I can supply a measured and controlled volume of material falling constantly down into the crushing zone and impinging upon the surface of the crushing head. The point of maximum feed of material over the edge of the plate rotates about the plate as the plate is gyrated. The stream thus fed may, under some conditions, be cylindrical in cross section, although of unequal thickness. In such case the point of maximum thickness of the cylinder wall will rotate in response to the gyration of the plate. Or the material may actually escape over the edge of the plate only about a more or less limited and constantly shifting arc. This depends upon the vertical adjustment of the feed spout $I^4$ in relation to the feed plate. In practice, most of this material will drop upon the upper inclined surface of the spider above the crushing zone, and will flow downwardly and inwardly therefrom until it strikes the crushing head. It will then be carried by the head against the concave for the first crushing impact.

Whereas the feeding means shown herein is perfectly practical, nevertheless I might control my feed by other mechanical means. Whatever the means be used, however, it is important that the feed be adjustable, and that it be constant when adjusted. While under-feeding will not normally affect the operation of my process, save as it reduces the volume crushed, over-feeding must be prevented. I may adjust my feed to allow for variations in size of the crushed product, and variations in the material crushed.

In its broad outline and dissociated from the specific crushing apparatus herein described and shown, my process consists in feeding a controlled stream of material of restricted volume between two opposed crushing elements, one of which is preferably fixed and the other of which is moved periodically toward and away from the fixed element. The crushing surface of the fixed element is preferably overhanging, and the surface of the moving element is preferably inclined, both to the overhanging fixed element and to the course of the material as it drops by gravity through the crushing zone. Material is fed by gravity into the crushing zone between the opposed crushing elements, the stream being controlled to prevent the filling of the crushing zone and the packing of material therein, since it is essential for the carrying out of my process that the material may drop freely by gravity into and through the crushing zone, except so far as the course of the material being crushed is impeded or interrupted by the successive conveying excursions and crushing impacts of the moving element. The opposed crushing members are preferably, though not necessarily, provided with a zone of parallelism, through which the particles must pass before they can escape from the crushing zone.

Thus each particle as it passes through the crushing zone of my process moves or is operated upon in three different ways. Part of the time it drops by gravity, part of the time it slides freely along an inclined surface, and part of the time it is undergoing a reduction during actual crushing contact. Substantially all particles are at all times undisturbed, and relatively unaffected by the association with other particles, in that they are either dropping freely under the influence of gravity, or are able to sort themselves freely as they drop upon and are scattered upon the surface of the moving crushing element, and finally are crushed only so far, in the main, as each individual particle is itself in contact with both of the opposed crushing surfaces.

I claim:

1. The process of crushing material, which consists in feeding such material by gravity between a pair of opposed crushing elements, and causing all particles of the material to fall by gravity therebetween toward the discharge opening, in successively interrupting the drop of such material and in supporting it upon and carrying it laterally upon one of said elements toward the opposed crushing element, while in contact with only the carrying element, in terminating such lateral excursion with a crushing impact, and causing all particles of the material to drop freely under gravity upon the first of said elements, after such crushing impacts, again conveying them laterally thereupon in an excursion terminating in the succeeding crushing impact, and discharging the finally reduced material by gravity from the crushing zone.

2. The process of crushing material which consists in feeding material by gravity between a pair of opposed crushing members, one fixed and one moving, in causing to move downwardly across the crushing surface of the moving member a layer of material of a thickness substantially less than the distance between the opposed crushing members when the moving member is at its maximum retraction, in interrupting the flow of the material between the opposed members by a plurality of crushing impacts, and in causing each particle to drop freely after each such crushing impact upon the moving member.

3. The process of crushing material which consists in feeding it by gravity between a pair of opposed crushing members, one fixed and one moving, in causing the material to flow downwardly across the surface of the moving member in substantially a single layer of particles, in interrupting the downward flow of the material by a succession of crushing impacts, and in causing the material to drop freely under gravity, after each such impact, upon the moving member.

4. The process of crushing material which consists in feeding it by gravity between a pair of opposed crushing members having faces circular in cross-section, one positioned within the other, in causing the material to flow freely under gravity, between said members, in intermittently interrupting the flow of material by catching it between the opposed members for a crushing impact, in delivering the crushing impact simultaneously about an arc of substantially less than 180 degrees and in moving such arc of impact rapidly about the circumferences of the opposed members.

5. The process of crushing material which consists in feeding it by gravity between a pair of opposed crushing members, having faces circular in cross-section, one positioned within the other, in causing the material to flow freely under gravity, between said members, in intermittently interrupting the flow of material by catching it between the opposed members for a crushing impact, in delivering the crushing impact simultaneously about an arc of substantially less than 180 degrees at the top of said members, and substantially less than 90 degrees at the bottom of said members, and in moving such arcs of impact rapidly about the circumferences of the opposed members.

6. The process of crushing material which consists in feeding it by gravity between a fixed overhanging crushing element and an opposed moving element, in interrupting the gravital drop of the material between the opposed crushing elements by intermittently moving the moving element toward the fixed element, in withdrawing the moving element from the fixed element, after such crushing impacts, through excursions of such length and frequency as to withdraw it from supporting contact with the material, and thereby permitting the material to fall freely under gravity upon a lower portion of the moving member after such crushing impacts.

7. The process of crushing material, which consists in feeding such material by gravity between a pair of opposed crushing elements, and causing all particles of the material to fall by gravity therebetween, in successively interrupting the drop of such material and in supporting it upon and carrying it laterally upon one of said elements toward the opposed crushing element, while in contact with only the carrying element, in terminating such lateral excursion with a crushing impact, and causing all particles of the material to drop freely under gravity upon the first of said elements, after such crushing impacts, and again conveying them laterally thereupon in an excursion terminating in the succeeding crushing impact, and in successively increasing the distance through which the material is laterally conveyed prior to the crushing impact, in relation to the length of the actual crushing excursion, as it passes through the crushing zone.

8. The process of crushing material, which consists in feeding it by gravity between a pair of opposed crushing elements, in interrupting the flow of the material between such elements by moving one of said crushing elements intermittently toward the other and withdrawing the moving element from the opposed element far enough and fast enough to permit the material to drop freely under gravity and scatter across the surface of a lower portion of the moving element after each crushing impact, and moving the said crushing element laterally, while the material is scattered on it, in a movement terminating in a succeeding crushing impact.

9. The process of crushing material which consists in feeding it by gravity between opposed crushing elements, and in restricting the feed of the material in relation to the timing of the crushing strokes, and delivering it across the crushing surface of one of said elements in a layer which is at all points throughout the crushing zone of substantially less depth than the distance between the crushing elements at their maximum recession.

10. The process of crushing material which consists in feeding it by gravity between opposed crushing elements, and in restricting the feed of the material in relation to the timing of the crushing strokes, and delivering it across the crushing surface of one of said elements in a layer which is at all points throughout the crushing zone of substantially less depth than the distance between the crushing elements at their maximum recession, and in decreasing the depth of the layer in relation to the distance of maximum recession of the opposed elements, progressively from top to bottom of the crushing zone.

11. The process of crushing material, which consists in passing it by gravity between an inclined overhanging fixed crushing surface and an opposed moving crushing surface inclined thereto and to the path of the material as it drops between the crushing surfaces, successively catching the material upon the moving surface as it drops by gravity, conveying it laterally thereupon against the fixed surface, causing each particle thereof to drop freely away from said fixed surface in response to gravity after each such crushing impact, and in delivering it by gravity, after the last of such lateral excursions, to a secondary crushing zone having a substantially uniform crushing clearance throughout its length, permitting the material to pass therethrough, and interrupting its passage by crushing impacts so timed in relation to the time of passage by gravity of the material through such secondary zone as to prevent the escape of any individual particle therethrough larger than the minimum space between said surfaces without receiving at least one crushing impact.

12. The process of crushing material, which consists in maintaining a storage body of the material to be crushed at a point above the crushing zone, in feeding the material thence by gravity between a pair of opposed crushing members, and limiting the feed of material therebetween to a layer of a thickness substantially less than the distance between the opposed crushing members when the moving member is at its maximum retraction, in interrupting the flow of the material between the opposed members by a plurality of crushing impacts, and in causing each particle to drop freely after such crushing impact upon the moving members, and in again conveying it laterally in an excursion terminating in a succeeding crushing impact.

13. The process of crushing material, which consists in maintaining a storage body of the material to be crushed at a point above the crushing zone, in feeding the material thence by gravity between a pair of opposed crushing members, and in moving the points of maximum feed from said storage body progressively about the circumference thereof, and limiting the feed of material therebetween to a layer of a thickness substantially less than the distance between the opposed crushing members when the moving member is at its maximum retraction, in interrupting the flow of the material between the opposed members by a plurality of crushing impacts, and in causing each particle to drop freely after such crushing impact upon the moving member, and in again conveying it laterally in an excursion terminating in a succeeding crushing impact.

14. The process of crushing material which consists in maintaining a storage body of the material to be crushed at a point above the crushing zone, in feeding the material thence to a crushing zone defined by a moving cone and a fixed concave, in moving the point of maximum feed from the storage body to the crushing zone progressively about the circumference of the crushing zone, in causing the material to flow by gravity between the opposed cone and concave in a layer substantially thinner than the maximum distance between cone and concave throughout the crushing zone, in successively interrupting the drop of the material and in supporting it upon and carrying it laterally upon the cone toward the concave, while in contact only with the cone, in terminating such lateral excursion with a crushing impact, in causing all particles to drop freely under gravity upon the cone after such crushing impacts, and again conveying them laterally in excursions terminating in crushing impacts.

15. The process of crushing material, which consists in feeding the material by gravity between a pair of opposed crushing elements one of which overhangs the other, moving the lower of said crushing elements intermittently toward the other element to interrupt the flow of the material between such elements by a succession of crushing impacts, moving the lower of said elements intermittently away from the upper element at such speed and through such length of movement as to leave the material unsupported, whereby said material drops by gravity to the surface of said lower element and is scattered thereover prior to the succeeding impact movement of said element.

16. The process of crushing material, which consists in feeding material by gravity between a pair of opposed crushing elements one of which overhangs the other, moving the lower of said crushing elements toward the upper until it interrupts the flow of the material between such elements by a crushing nip, thereafter moving said lower element away from the upper element at such speed and through such length of movement as to leave the crushed particles unsupported, whereby said particles drop freely by gravity to the surface of the lower element and scatter thereover, and thereafter again moving the lower element toward the upper element until the particles are caught between the elements in an ensuing crushing nip, and continuing said succession of movements of the lower element toward and away from the upper element, while continuing the feed of material by gravity between said crushing elements.

17. The process of crushing material, which consists in feeding material by gravity through a crushing zone defined by a pair of opposed crushing elements one of which overhangs the other, limiting the gravital feed through the crushing zone to a volume substantially less than the area of the crushing space defined by the opposed crushing elements at their maximum separation, moving the lower of said crushing elements toward the upper until it interrupts the flow of the material between such elements by a crushing nip, thereafter moving said lower element away from the upper element at such speed and through such length of movement as to leave the crushed particles unsupported, whereby said particles drop freely by gravity to the surface of the lower element and scatter thereover, and thereafter again moving the lower element toward the upper element until the particles are caught between the elements in an ensuing crushing nip, and continuing said succession of movements of the lower element toward and away from the upper element, while continuing the feed of material by gravity through the crushing zone.

18. The process of crushing material which consists in feeding material by gravity through a crushing zone defined by a pair of opposed crushing elements one of which overhangs the other, in a volume substantially less than the capacity of said crushing zone when the opposed crushing elements are at their maximum separation, intermittently moving the lower of said crushing elements toward the other element, until it interrupts the flow of the material between such elements, in a succession of crushing impacts, and moving the lower of said elements away from the upper element after each such crushing impacts, at such speed and through such length of movement as to leave the particles unsupported after the crushing nip, whereby the crushed particles, released by the recession of the lower element, drop by gravity to a lower portion of said lower element and are scattered thereover prior to the succeeding crushing nip.

19. The herein described method of crushing material which consists in simultaneously restricting the feed of material through a crushing zone defined by a normally fixed overhanging upper crushing member and a moving lower crushing member, and intermittently moving the moving member toward the fixed member until the particles falling by gravity therebetween are gripped in a crushing impact, then moving it away from the fixed member after each crushing impact more rapidly than the crushed material can accelerate under gravity, and thereby permitting the crushed particles to drop freely by gravity away from the overhanging member and upon a lower portion of the moving member, thereby scattering the particles freely upon the surface of the moving member, and then again returning the moving member toward the fixed member until the scattered particles are again gripped between the opposed crushing members in an ensuing impact, and continuing this intermittent movement of the moving crushing member toward and away from the fixed crushing member, and thus crushing all the particles which pass by gravity through the crushing zone, while maintaining the crushing zone sparsely filled with material undergoing crushing when the moving member is at its most remote position from the fixed member.

20. The herein described method of crushing material which consists in feeding by gravity through a crushing zone defined by a normally fixed overhanging upper crushing member and a movable lower crushing member a volume of material substantially less than the capacity of the crushing cavity when the moving member is at its greatest recession from the fixed member, intermittently moving the moving member toward the fixed member until the particles falling by gravity therebetween are caught between the two members for a crushing impact, and moving the moving member away from the fixed member after each crushing impact at sufficient speed to withdraw it from contact with the crushed particles, thereby permitting the crushed particles to drop freely by gravity away from the overhanging member and upon a lower portion of the moving member, thus scattering the particles freely upon the surface of the moving member, and then returning the moving member toward the fixed member until the scattered particles are again gripped between the opposed crushing members in an ensuing impact, and continuing this intermittent movement of the moving crushing member toward and away from the fixed crushing member, thus crushing all the particles which pass by gravity through the crushing zone.

21. The process of crushing material, which consists in feeding the material by gravity through a crushing zone defined by a pair of opposed crushing elements, one of which crushing elements overhangs the other, moving the lower of said crushing elements intermittently toward the other element to interrupt the flow of material between such elements by a succession of crushing nips, moving the lower of said elements intermittently away from the upper element at such speed and through such length of movement as to leave the material unsupported, whereby said material drops freely by gravity to the surface of the lower element and is scattered thereover, and flows gravitally downwardly across the surface of said lower element, and terminating this gravital movement by an ensuing crushing nip of the material between the opposed crushing elements.

22. The process of crushing material, which consists in feeding the material by gravity through a crushing zone defined by a pair of opposed crushing elements, one of which crushing elements overhangs the other, moving the lower of said crushing elements intermittently toward the other element to interrupt the flow of material between such elements by a succession of crushing nips, moving the lower of said elements intermittently away from the upper element at such speed and through such length of movement as to leave the material unsupported, whereby said material drops freely by gravity to the surface of the lower element and is scattered thereover, and flows gravitally downwardly across the surface of said lower element, and terminating this gravital movement by an ensuing crushing nip of the material between the opposed crushing elements, and limiting the feed of material to the crushing zone to a volume substantially less than the capacity of the crushing zone when the lower element is withdrawn from the upper element.

EDGAR B. SYMONS.